(12) United States Patent
Blok et al.

(10) Patent No.: US 9,616,605 B2
(45) Date of Patent: Apr. 11, 2017

(54) PELLET MILL WITH AN IMPROVED FEED SYSTEM AND A METHOD OF FORMING PELLETED MATERIAL

(75) Inventors: Jesper Blok, Bramming (DK); Tomas Kire Hordum, Oksbøl (DK); Steen G. Lassen, Esbjerg V (DK)

(73) Assignee: ANDRITZ AG, Graz (AT)

( * ) Notice: Subject to any disclaimer, the term of this patent is extended or adjusted under 35 U.S.C. 154(b) by 699 days.

(21) Appl. No.: 14/114,722

(22) PCT Filed: Apr. 27, 2012

(86) PCT No.: PCT/EP2012/057727
§ 371 (c)(1),
(2), (4) Date: Jan. 27, 2014

(87) PCT Pub. No.: WO2012/146700
PCT Pub. Date: Nov. 1, 2012

(65) Prior Publication Data
US 2014/0167313 A1    Jun. 19, 2014

(30) Foreign Application Priority Data

Apr. 29, 2011 (EP) .................................. 11164246
Apr. 29, 2011 (EP) .................................. 11164249
Apr. 29, 2011 (EP) .................................. 11164251

(51) Int. Cl.
*B30B 11/20* (2006.01)
*B29C 47/00* (2006.01)
(Continued)

(52) U.S. Cl.
CPC ............ *B29C 47/0011* (2013.01); *B29B 9/10* (2013.01); *B29B 7/421* (2013.01)

(58) Field of Classification Search
CPC ............. Y10S 100/905; Y10S 100/907; B30B 11/003; B30B 11/27; B29C 31/04
See application file for complete search history.

(56) References Cited

U.S. PATENT DOCUMENTS 3,017,845 A    1/1962  Bonnafoux
3,045,280 A    7/1962  Bonnafoux
(Continued)

FOREIGN PATENT DOCUMENTS

FR    2 548 957    1/1985
GB      857133    12/1960
NL    8 901 038    11/1990

OTHER PUBLICATIONS

International Search Report for PCT/EP2012/057727 dated for Jun. 19, 2012.
(Continued)

*Primary Examiner* — Galen Hauth
(74) *Attorney, Agent, or Firm* — Nicholas Trenkle; Stites & Harbison, PLLC.

(57) ABSTRACT

The invention pertains to a pellet mill 2 for forming pelleted material, the pellet mill 2 comprising: A die 4 having a cylindrical inner surface 6 with a plurality of apertures 8 formed therein and extending to the outside of the die 4, the volume bounded by said inner cylindrical surface 6 defining a die chamber 10. At least two cylindrical rollers 12, 14, 16 adapted to travel over said inner cylindrical surface 6 of the die 4 in a rolling motion. Drive means for causing relative rotation of the die 4 and the rollers 12, 14, 16, so that the rollers 12, 14, 16 will travel over the inner cylindrical surface 6 of the die 4, thereby forming wedge-shaped spaces 18, 20, 22 between the rollers 12, 14, 16 and the inner cylindrical surface 6 of the die 4. A feed system, comprising at least two conduits 24, 26, 28, one associated with each of the at least two rollers 12, 14, 16, extending into the die chamber 10, each of the conduits 24, 26, 28 having a side opening 32 for feeding the pelletizable material 30 into the wedge-shaped spaces 18, 20, 22 between the rollers 12, 14, 16 and the inner cylindrical surface 6 of the die 4, the side opening 32 extending axially along the conduit 24, 26, 28 and having an extension that is equal to the length of the (Continued)

rollers 12, 14, 16, wherein at least one of the conduits 24, 26, 28 is configured for feeding the pelletizable material 30 directly to a wedge-shaped space 22, which is at a higher location in the die chamber than said conduit 28.

21 Claims, 6 Drawing Sheets

(51) Int. Cl.
*B29B 9/10* (2006.01)
*B29B 7/42* (2006.01)

(56) References Cited

U.S. PATENT DOCUMENTS

| | | | |
|---|---|---|---|
| 3,807,926 A | 4/1974 | Morse | |
| 3,841,817 A * | 10/1974 | Moldenhauer | B30B 11/208 425/190 |
| 3,932,091 A | 1/1976 | Vink | |
| 4,162,881 A * | 7/1979 | Morse | B30B 11/207 425/331 |
| 4,711,622 A | 12/1987 | Schaffner | |
| 4,770,621 A | 9/1988 | Groebli et al. | |
| 4,861,529 A | 8/1989 | Groebli et al. | |
| 6,634,508 B1 | 10/2003 | Ishigaki | |

OTHER PUBLICATIONS

Written Opinion of the International Searching Authority for PCT/EP2012/057727 dated for Jun. 19, 2012.

Applicants Aug. 2013 Response to Written Opinion for PCT/EP2012/057727.

International Preliminary Report on Patentability for PCT/EP2012/057727 dated for Sep. 5, 2013.

* cited by examiner

PELLET MILL WITH AN IMPROVED FEED SYSTEM AND A METHOD OF FORMING PELLETED MATERIAL

TECHNICAL FIELD

The present invention pertains to a pellet mill and method for forming pelleted material, the pellet mill comprising: A die having a cylindrical inner surface with a plurality of apertures formed therein and extending to the outside of the die, the volume bounded by said inner cylindrical surface defining a die chamber. The pellet mill further comprises at least two cylindrical rollers adapted to travel over said inner cylindrical surface of the die in a rolling motion, and drive means for causing relative rotation of the die and the rollers, so that the rollers will travel over the inner cylindrical surface of the die, thereby forming wedge-shaped spaces between the rollers and the inner cylindrical surface of the die. The pellet mill also comprises a feed system for feeding the pelletizable material into the die chamber.

BACKGROUND OF THE INVENTION

Pellet mills with rollers that cooperate with a cylindrical die having a plurality of circular apertures are conventionally used to produce pellets for animal food or wood pellets that are used in furnaces or wood burning stoves, which for example are used in domestic or district heating systems.

A problem with the commonly used pellet mills is that the pelletizable material is fed directly into the die cylinder, and therefore due to the influence of gravity has a tendency to accumulate in the "bottom" of the die chamber. This causes large unbalances in the pellet mill, because not all rollers are fed the same quantity of material, which material furthermore may be unevenly distributed along the width of the roller. These unbalances lead to an increased wear of the structural elements of the pellet mill, especially its bearings. Ultimately, this will lead to increased maintenance work on the pellet mill, which is unproductive while being maintained, and greatly reduces the lifetime of it.

To overcome these difficulties, a number of solutions have been suggested. For example in U.S. Pat. No. 4,162,881 is disclosed a pellet mill with two side-by-side rollers which are disposed in respective first and second hemispheres (divided along a vertical center line) of rotation of a vertical rotatable cylindrical pellet die having a plurality of apertures. Pelletizable material is fed in independent first and second conduits for each roller. The first conduit deposits the pelletizable material in the first hemisphere above the first roller, while the second conduit supplies the pelletizable material also in the first hemisphere of rotation below the first roller. Thus, such material is initially deposited on the die member from the conduit and is carried during rotation by centrifugal force to the second roller. The pelletizable material is not fed directly to a wedge-shaped space between a roller and the inner cylindrical surface of the die. This implies that not all the material fed by the second conduit is carried to the second roller. The material has therefore a tendency to build up in the bottom of the die chamber, which again will lead to the unbalances discussed above. Another disadvantage of this pellet mill is that it does not permit the use of a traditional shear pin safety mechanism, because the conduits would prevent the free rotation of the rollers, if the shear pin is broken.

In U.S. Pat. No. 3,932,091 is disclosed a pellet mill for making food pellets from a flour product. The mill comprises a number of feed tubes, one for each extrusion roller, which tubes each extend axially through the interior of the annular die between the rollers and near the inner surface of the annular die. The flour product is fed to these tubes by screw conveyors. Each feed tube has a side opening having the same axial length as the associated roller and having a circumferential width which gradually increases inwardly. It is alleged that this leads to an even distribution of the flour product over the length of the roller and the effective width of the annular die.

In EP 0371 519 is disclosed a pellet mill with two rollers mounted on roller shafts having an eccentric stud. The rollers are also provided with cylinder and piston means for adjusting the distance between the rollers and the inner cylindrical surface of the die. These cylinder and piston means are provided with internal position sensors for measuring said distance.

In FR 2 548 957 is disclosed a pellet mill employing a shear point safety pin, which is configured to shear in the event of an accidental blocking of the system.

Furthermore, the documents U.S. Pat. Nos. 3,807,926, 4,711,622, 3,045,280 and GB 857,133 disclose various feeding mechanisms for pellet mills.

SUMMARY OF THE INVENTION

It is thus an object of the present invention to provide a pellet mill with an improved feed system, whereby the unbalances inherent to the prior art devices discussed above are alleviated.

According to the present invention, the above-mentioned and other objects are fulfilled by a pellet mill for forming pelleted material, the pellet mill comprising the following main parts:

a die having a cylindrical inner surface with a plurality of apertures formed therein and extending to the outside of the die, the volume bounded by said inner cylindrical surface defining a die chamber, at least two cylindrical rollers adapted to travel over said inner cylindrical surface of the die in a rolling motion, drive means for causing relative rotation of the die and the rollers, so that the rollers will travel over the inner cylindrical surface of the die, thereby forming wedge-shaped spaces between the rollers and the inner cylindrical surface of the die, a feed system, comprising at least two conduits, one associated with each of the at least two rollers, extending into the die chamber, each of the conduits having a side opening for feeding the pelletizable material into the wedge-shaped spaces between the rollers and the inner cylindrical surface of the die, the side opening extending axially along the conduit and having an extension that is equal to the length of the rollers, wherein at least one of the conduits is configured for feeding the pelletizable material directly to a wedge-shaped space, which is at a higher location in the die chamber than said conduit.

By providing a side opening in the conduit extending axially along it, and having an extension that is equal to the length of the rollers, an even distribution of the pelletizable material over the outer cylindrical surface of the rollers is achieved. This causes a more efficient use of the pellet mill, because virtually the full lengths of the rollers are used in the process. Furthermore, an even distribution of the pelletizable material over the full lengths of the rollers gives an even distribution of the load on the individual roller. It is of importance for the balancing of the forces acting on the individual structural parts of the pellet mill that the at least two rollers are placed symmetrically within the die chamber.

Thus, one of the wedge-shaped spaces will be placed at a higher location than the conduit feeding pelletizable material to it. Hence, by feeding the pelletizable material directly to a wedge-shaped space, which is at a higher location in the die chamber than said conduit from which it is fed, it is achieved that the pelletizable material is fed directly to the place where it is needed, and the problems mentioned above with the pelletizable material having a tendency to accumulate in the bottom of the die chamber are therefore completely alleviated or at least greatly reduced. Accordingly, a pellet mill according to the invention does not suffer from the unbalances prone to the prior art pellet mills, such as the one disclosed in U.S. Pat. No. 4,162,881, which leads to a greatly reduced wear on its bearings. This tremendously increases the lifetime of the pellet mill, as well as reduces the need for cumbersome and laborious maintenance. The feed system of the pellet mill according to the current invention can thus be viewed as an improvement of the feed system known from U.S. Pat. No. 4,162,881.

According to an embodiment, the pellet mill may comprise at least three rollers and at least three associated conduits. This will greatly increase the pelletizable material processed by the pellet mill, because of the at least one extra roller. However, if the rollers are too small they will have a tendency to slip on the inner cylindrical surface of the die which will lead to unbalances and eventually a total stop of the pellet mill. Hence, too many rollers in any given die is also not beneficial. Thus, in a preferred embodiment, the pellet mill comprises three rollers. Hereby an optimal ratio between the radius of the rollers and the radius of the inner cylindrical surface of the die is achievable, wherein the pellet output is optimized and at the same time securing a reliable running of the pelleting process.

Preferably, the at least one of the conduits, which is configured for feeding the pelletizable material directly to a wedge-shaped space, which is at a higher location in the die chamber than said conduit, is configured for expelling the pelletizable material through its side opening in an upward direction.

A large variety of material can be pelletized by a pellet mill according to the invention. For example, the pellets may be employed in the mixed feed industry, oil industry, flour milling or bran pelletizing, and for the manufacture of cattle feeds. It is well suited for pelletizing of a pulverized finely ground alfalfa hay product formed by dehydration of a leafy legume. Such leguminous materials include a gradation of particle sizes and densities with a leafy vein-containing portion and a stem portion with a latent adhesive material activated by contact with water.

For many pelletizable materials, such as hay, it is advantageous to provide heated water in the form of steam or the like to the product prior to or simultaneously with pelletizing. This may be accomplished in a number of different techniques. One technique includes a hopper which drops material into a feeding screw assembly which directs the pelletizable material to a mixing screw assembly to which steam and/or other liquids are added. From there, the moistened pelletizable material is directed to the at least two conduits.

According to a preferred embodiment, the pelletizable material is wood, provided in small particle sizes, for example sawdust or sawdust-like wood particles or slightly larger wood particles. The pelletizable material has preferably a particle size of less than 5 mm, more preferably between 1.5 and 3 mm. Pelletizing of wood particles is significantly more difficult than pelletizing animal food products, which contain starch, because the starch will act as a binder binding the material together. For example it requires typically 50 70 kWh to pelletize one ton of wood, while it only requires between 7 and 20 kWh to pelletize one ton of food material.

The pellet mill may further comprise means for angular adjustment of each of the conduits about its longitudinal axis, thereby adjusting the direction, in which the pelletizable material is expelled through the side opening. Hereby is achieved that the feed of pelletizable material into the die chamber may be accurately adjusted, for example in dependence of the other structural parts of the pellet mill.

Preferably, the conduits have a circular cross section, and each comprises a screw conveyor having a shaft tapering in the direction of feed.

In a preferred embodiment, the pellet mill may further comprise drive means for driving the screw conveyors, which extend into the conduits independently of each other. Hereby is achieved that the quantity of pelletizable material that is feed into the wedge-shaped spaces may be individually adjusted.

According to another preferred embodiment, the pellet mill may further comprise drive means for dynamically adjusting the speed of each of the screw conveyors independently of each other, and in dependence of the measurement of at least one working condition of the pellet mill. Hereby is achieved that the quantity of pelletizable material, which is fed to each individual roller or each individual wedge-shaped space, may be stopped or reduced, if any particular roller for one reason or the other is not able to pelletize the material feed to it and thereby greatly reduce the risk of break-down of the mill. Also in the event that one of the rollers has too little pelletizable material to work on, then it may lead to unbalances in the pellet mill and the associated problems referred to above. Therefore, it is by this embodiment also achieved that the quantity of material fed to any of the rollers of any of the wedge-shaped spaces may be increased if needed.

According to an embodiment, the conduits are connectable to a common material supply.

According to another preferred embodiment, the screw conveyors in the conduits are driven by a fixed relatively high angular speed —for example 370 rpm. Investigations have shown surprisingly good results for angular speed in the interval between 300 rpm and 500 rpm. Each of the conduits (and thereby each screw conveyor) is connected to individual hopper means, which in turn are fed by individual dosing conveyors that feed each of said individual hopper means. In a further embodiment, each of these dosing conveyors are operatively connected to control means for individually adjusting the feed of pelletizable material to each individual hopper means associated with each individual conduit in dependence of at least one working condition of the pellet mill.

Each of the rollers may according to a preferred embodiment be mounted on a roller shaft having an eccentric stud portion, whereby it is possible to adjust the distance between the die and rollers in the event of a malfunction of one of the rollers. For example each of the roller shafts may be equipped with a shear pin safety mechanism, so that in the event of overload of one of the rollers, the pin will be broken, and the roller shaft will then rotate about its eccentric axis, thereby increasing the distance between the roller and the inner cylindrical surface of the die and thus preventing a breakdown of the pellet mill. It is contemplated that a safety mechanism of this kind is just as effective as the shear pin safety mechanisms of the pellet mills known in the art. However, the present safety mechanism does not suffer from the same problems as those known in the art, because the rollers are not free to rotate within the die, whereby it is precluded that they would interfere with the conduits in the event of an overload of one of the rollers.

According to yet another embodiment of a pellet mill according to invention, each of the rollers are mounted on a roller shaft, and each of the roller shafts is operatively connected to positioning means for individually adjusting the distance between each roller and the cylindrical inner surface of the die dependent on the measurement of at least one working condition of the pellet mill.

During use the rollers are subjected to large radial forces. These forces are caused by the pressure that is built up between the rollers and the inner cylindrical surface of the die, when the pelletizable material is compressed between them. These forces are generally proportional to the quantity of material that is fed to each individual roller. Thus, if not exactly the same quantity of pelletizable material is fed to each roller at the same time, then these forces will not balance each other. And the pellet mill will thus suffer from unbalances. The difference in these forces gives rise to a resulting force, which will impact the structural elements which the rollers and die are suspended from, especially the bearings will be subjected to substantial wear.

Another problem with a pellet mill of the kind discussed above is that it can only work if the rollers are rotating. Under normal operating conditions, the rollers will rotate together with the die due to the frictional forces between the inner cylindrical surface of the die, the pelletizable material and the rollers. If a too large quantity of pelletizable material is fed to a roller, or if the pelletizable material does not cause a sufficiently large friction, then the roller will have a tendency to slide instead of rotate and therefore not be able to press the material through the apertures in the die. If in such a situation, material is still fed into the die chamber, and in particular to the sliding roller, then the particular wedge-shaped space in question will be overfilled and get stuck. Usually such a malfunctioning will imply that the pellet mill has to be opened and the die chamber emptied totally for pelletizable material, before it may be started again.

Thus, the at least one working condition of the pellet mill that is mentioned above with respect to the description of various embodiments mentioned above, is preferably the angular speed of rotation of a roller and/or the physical distance between a roller and the inner cylindrical surface of the die, but may also comprise or be other working conditions of the pellet mill.

If the angular speed of rotation of a roller slows down, it is an indication that it starts sliding, which again is an indication of the fact that this particular roller is fed too much pelletizable material. This information may then be used to slow down the screw conveyor in the conduit that is feeding that particular roller and/or it can be used to adjust the position of the roller so that it is moved away from the inner cylindrical surface of the die.

Similarly, if a measurement of the physical distance between a roller and the inner cylindrical surface of the die shows that it is increasing, this may be an indication that this particular roller is fed too much pelletizable material. This information may then be used to decrease the speed of the screw conveyor in the conduit that is feeding that particular roller and/or it can be used to adjust the position of the roller so that it is moved even further away from the inner cylindrical surface of the die, in order to prevent a break-down of the pellet mill.

In any of the embodiments discussed above, the positioning means may comprise hydraulic cylinder and piston means. By applying hydraulic cylinder and piston means, the maximal force on any individual roller can be determined by a vent. This implies that the force will be substantially constant during the pelleting process until possibly the maximal force is reached. In comparison to this setup, a spring loaded roller will exhibit a growing force in reaction to an increasing load on a roller.

According to a preferred embodiment, the distance between a roller and the inner cylindrical surface of the die is dynamically adjusted in dependence of a measurement of the oil pressure of the hydraulic system associated with the hydraulic cylinder and piston means that is operatively connected to that particular roller.

For example by setting the oil pressure in the hydraulic system to say 10% over the level that is necessary for producing the particular pellets, it will be possible to limit the unbalances in the system to a well-defined low level. The overall effect of this is that the pellet mill will suffer from smaller load or strain than those mills that are known in the art.

The pellet mill, e.g. the system of rollers, measurement means, drive means and positioning means, may be at least in part self-regulating. Preferably, the hydraulic pressure on a particular cylinder and piston means, which is operatively connected to a particular roller, is set to a fixed value. If a roller then is subjected to a pressure force that exceeds this fixed value of hydraulic pressure, then that particular roller is moved away from the inner cylindrical surface of the die. Hereby a so-called mat of unprocessed pelletizable material is left on the inner cylindrical surface of the die. This mat will therefore be sent to the next roller, which will then press the pelletizable material through the apertures in the die, or also this second roller will be moved away from the inner cylindrical surface of the die and send the material (back to the first roller in the embodiment with only two rollers, or) to the next roller in the pellet mill. If all of the rollers are moved away from the inner cylindrical surface of the die, this may be an indication that the pellet mill is loaded beyond its capacity, i.e. it is fed too much pelletizable material, where after the supply of pelletizable material to the die chamber of the pellet mill may be reduced, until the oil pressure in the hydraulic system(s) again is below the previously set fixed value at which it is able to maintain the position of the roller in its correct operating position.

In a further embodiment of a pellet mill according to the invention, the screw conveyor in each of the conduits may comprise a first section comprising a helical screw and a second section comprising a plurality of curved expulsion blades, wherein said blades have an increased curvature in the direction towards the helical screw and a length corresponding to the length of the side opening in the conduits.

The above mentioned and further objects are also fulfilled by a method of forming pellets in a pellet mill having a cylindrical die chamber, the method comprising the steps of:
feeding pelletizable material into the cylindrical die chamber via at least two conduits, one associated with each of at least two rollers within the die chamber, the conduits extending into the die chamber,
relatively rotating a die and the at least two rollers, thereby causing the rollers to travel over an inner cylindrical surface of the die in a rolling motion, thereby forming wedge-shaped spaces between the rollers and the inner cylindrical surface of the die, whereby the pelletizable material is forced through a plurality of apertures formed in the inner cylindrical surface of the die and extending to the outside of the die, expelling the pelletizable material directly into the wedge-shaped spaces between the rollers and the inner cylindrical surface of the die through a side opening in each of the at least two conduits, the side opening extending axially along the conduit and having an extension that is equal to the length of the rollers.

According to a preferred embodiment of the method, the at least two rollers and at least two associated conduits are exactly three rollers and exactly three associated conduits.

According to another preferred embodiment of the method, the at least one of the conduits expels the pelletizable material in an upward direction directly to a wedge-shaped space, which is at a higher location in the die chamber than said conduit.

The method may according to another embodiment further comprise the step of adjusting the direction in which the pelletizable material is expelled through the side opening by angularly adjusting each of the conduits about its longitudinal axis.

The method may according to a further embodiment comprise the step of feeding the pelletizable material to each of the conduits via individual hopper means (38, 40, 42) connected to each of the conduits.

The method may according to a further embodiment comprise the step of individually adjusting the feed of pelletizable material to each individual hopper means in dependence of at least one working condition of the pellet mill by dosing conveyors feeding the pelletizable material to each individual hopper means.

The method may according to a further embodiment comprise the step of providing each of the rollers with a roller shaft having an eccentric stud.

The method may according to a further embodiment comprise the step of providing each of the roller shafts with a shear point safety pin configured to break in response to an overload condition of the pellet mill.

The method may according to a further embodiment comprise the step of adjusting the distance between a roller and the inner cylindrical surface of the die by hydraulic cylinder and piston means.

The step of adjusting the distance between a roller and the inner cylindrical surface of the die may, according to a further embodiment, be performed in dependence of a measurement of the oil pressure of the hydraulic system associated with the hydraulic cylinder and piston means.

Alternatively, the movement and/or position of the individual cylinders is monitored, and the cylinder and piston means of all the rollers will be adjusted in dependence of the measured oil pressure is of the whole system.

BRIEF DESCRIPTION OF THE DRAWINGS

A further understanding of the nature and advantages of the present invention may be realized by reference to the remaining portions of the specification and the drawings. In the following, preferred embodiments of the invention are explained in more detail with reference to the drawings, wherein FIG. 1 schematically illustrates an embodiment of a pellet mill according to the invention.

DETAILED DESCRIPTION

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete and will fully convey the scope of the invention to those skilled in the art. Like reference numerals refer to like elements throughout. Like elements will, thus, not be described in detail with respect to the description of each figure.

Figure 1:
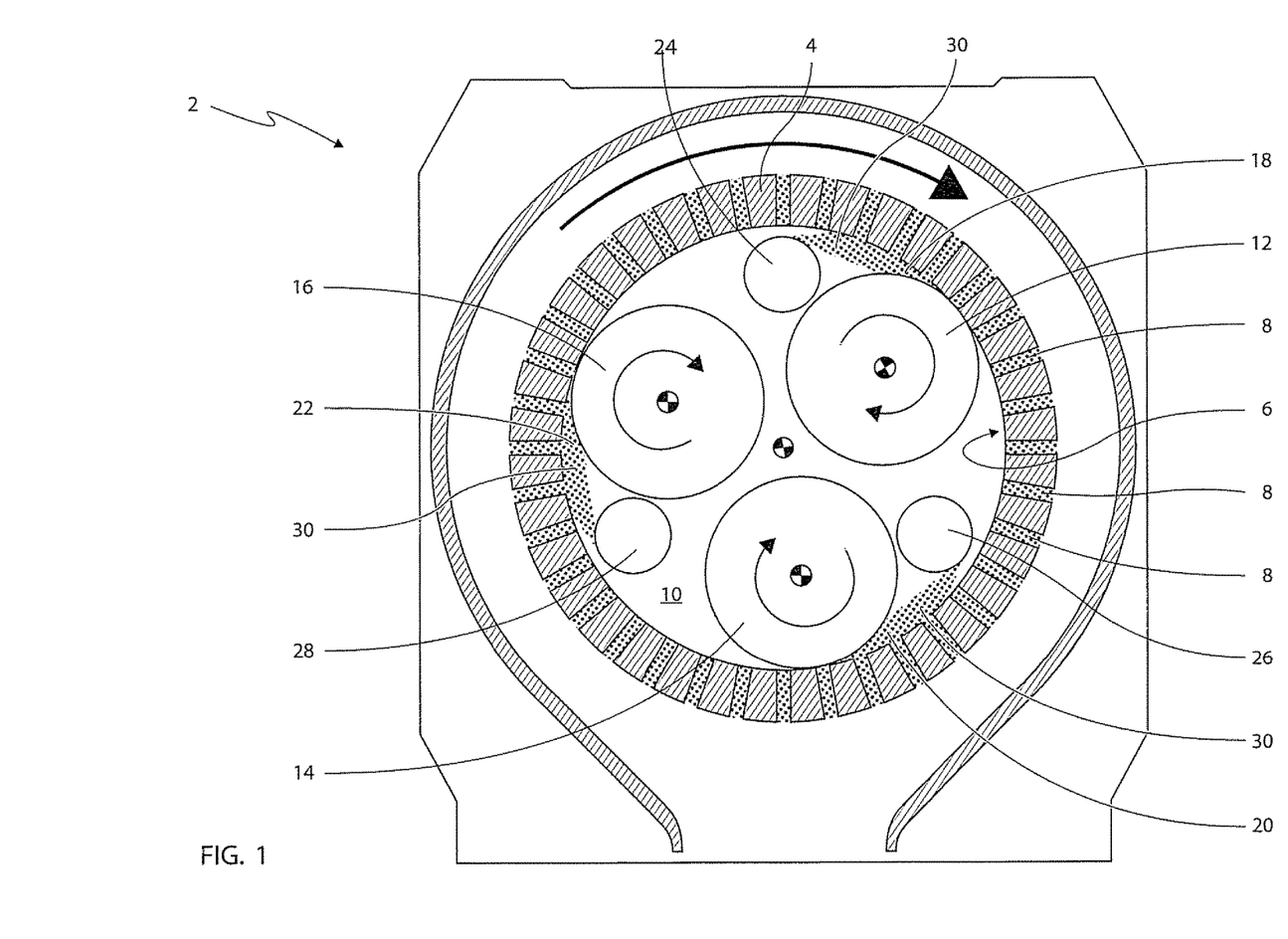

In FIG. 1 an embodiment of a pellet mill 2 according to the invention is schematically illustrated. The illustrated pellet mill 2 comprises a die 4 having a cylindrical inner surface 6 with a plurality of apertures 8 formed therein and extending to the outside of the die 4, the volume bounded by said inner cylindrical surface 6 defines a die chamber 10.

In the illustrated embodiment, the pellet mill 2 comprises three rollers 12, 14 and 16. Hereby an optimal ratio between the radius of the rollers 12, 14, 16 and the radius of the inner cylindrical surface 6 of the die 4 is achievable, where the pellet output is optimized and at the same time securing a reliable running of the pelleting process.

The rollers 12, 14, 16 are cylindrical and adapted to travel over said inner cylindrical surface 6 of the die 4 in a rolling motion as illustrated by the arrows on the rollers 12, 14, 16. The die 4 also rotates in the same direction as the rollers 12, 14, 16, as illustrated by the arrow placed above said die 4.

Although not illustrated in the present schematic illustration of the pellet mill 2, it also comprises drive means for causing relative rotation of the die 4 and the rollers 12, 14, 16, so that the rollers 12, 14, 16 will travel over the inner cylindrical surface 6 of the die 4, thereby forming wedge-shaped spaces 18, 20, 22 between the rollers 12, 14, 16 and the inner cylindrical surface 6 of the die 4.

The pellet mill 2 also comprises a feed system, comprising three conduits 24, 26, 28, one associated with each of the rollers 12, 14, 16, extending into the die chamber 10, each of the conduits 24, 26, 28 has a side opening for feeding the pelletizable material 30 into the wedge-shaped spaces 18, 20, 22 between the rollers 12, 14, 16 and the inner cylindrical surface 6 of the die 4. The conduit 28, which is associated with the roller 16, is configured for feeding the pelletizable material 30 directly to a substantially wedge-shaped space 22, which is at a higher location in the die chamber 10 than said conduit 28.

Figure 2:
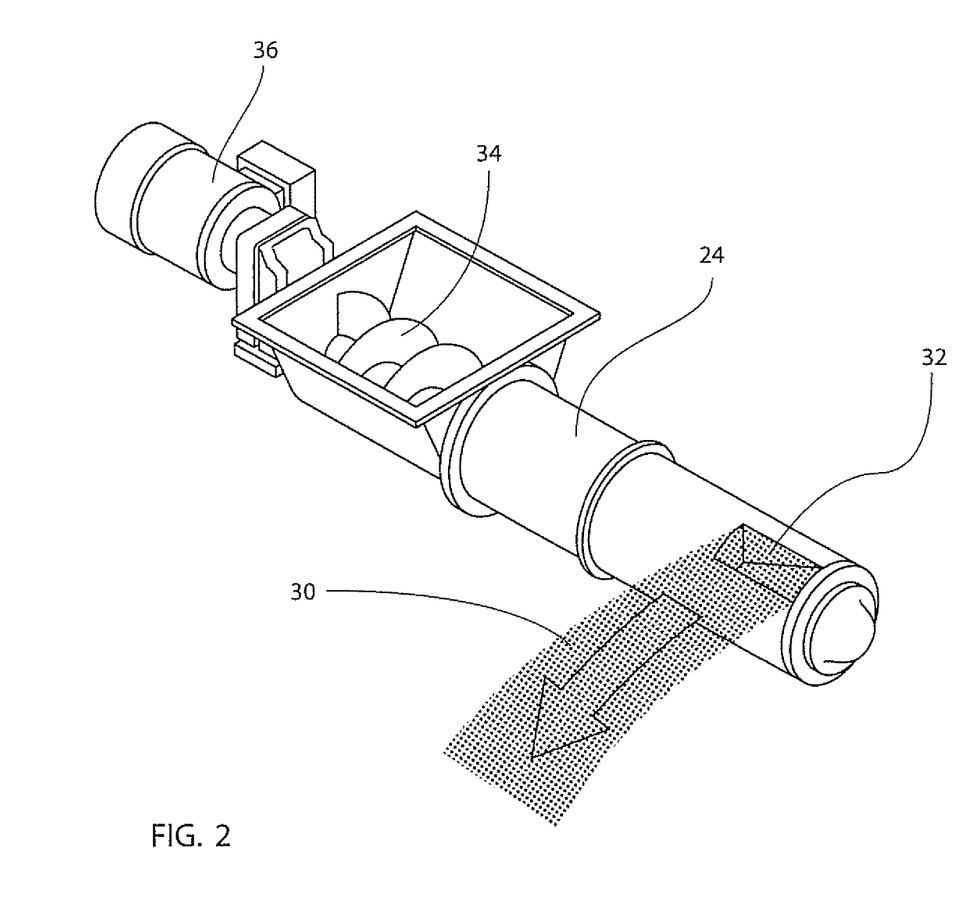
FIG. 2 shows an individual conduit.

In FIG. 2 a single conduit 24 is schematically illustrated. The conduit 24 is equipped with a side opening 32, which extends axially along the conduit 24. The extension of this side opening 32 is equal to the length of the roller 12.

The conduit 24 has a circular cross section and comprises a screw conveyor 34 having a shaft tapering in the direction of feed. Operatively connected to the screw conveyor 34 is drive means 36 for driving the screw conveyor 34. These drive means 36 are preferably a controllable electrical motor.

In principle the other conduits 26, 28 are similar to this one and will therefore not be illustrated separately. Hereby is achieved that the quantity of pelletizable material 30 that is fed into the wedge-shaped spaces 18, 20, 22 may be individually adjusted by controlling the drive means associated with each of the screw conveyors.

Figure 3:
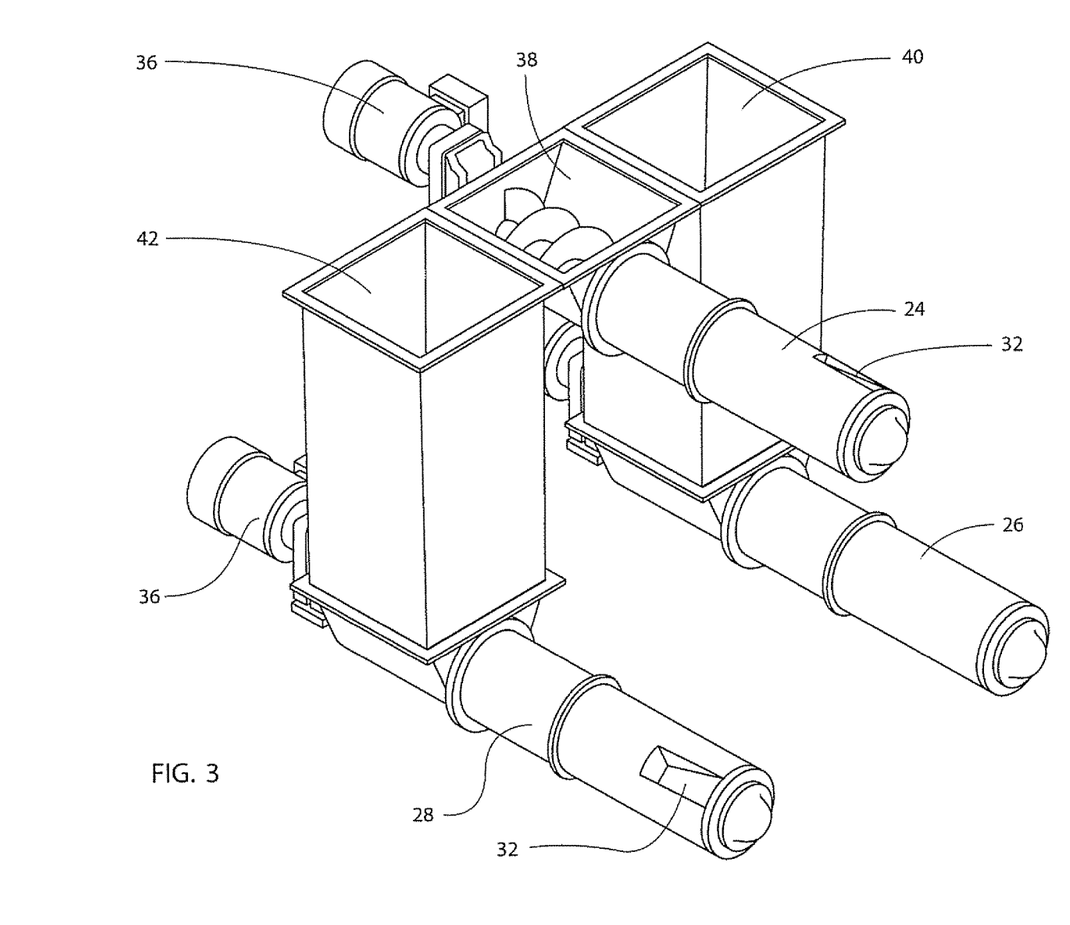
FIG. 3 shows a feed system for a pellet mill having three rollers.

In FIG. 3 a side view of the feed system for the pellet mill 2 in FIG. 1 is illustrated. The feed system comprises three conduits 24, 26, 28, and each of the conduits 24, 26, 28 is connected to an associated hopper means 38, 40, 42 for supplying pelletizable material to the conduits 24, 26, 28. The hopper means 38, 40, 42 are connected to a common material supply.

Figure 4:
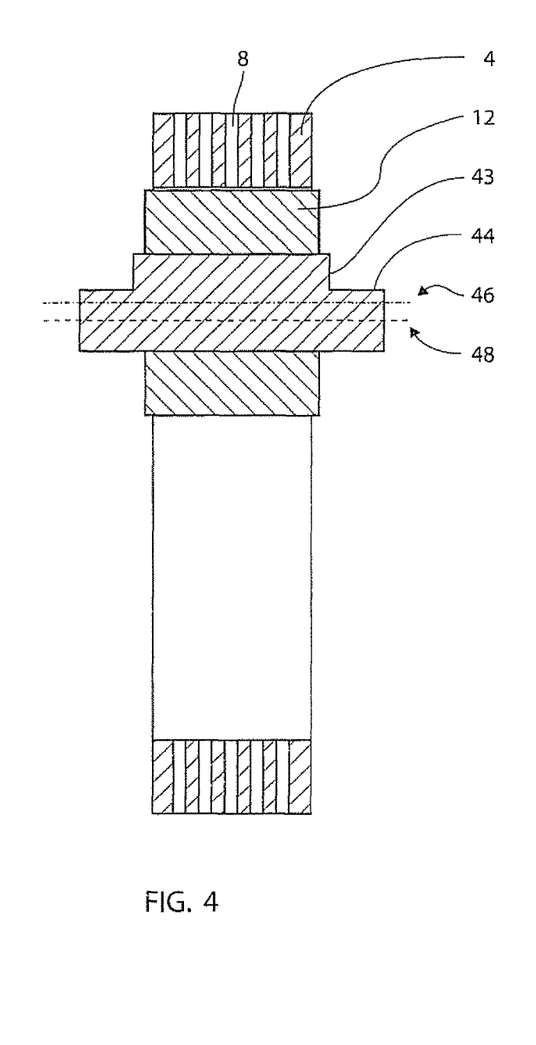
FIG. 4 illustrates a cross section showing an eccentric roller shaft.

As illustrated in FIG. 4, each of the rollers 12 may according to a preferred embodiment be mounted on a roller shaft 44 having an eccentric stud portion 43, whereby it is possible to adjust the distance between the inner cylindrical surface 6 of the die 4 and rollers 12 in the event of a malfunction of one of the rollers 12. For example each of the roller shafts 44 may be equipped with a shear pin safety mechanism so that in the event of overload of one of the rollers 12, the pin will be broken and the roller shaft 44 will then rotate about its eccentric axis 48, thereby increasing the distance between the roller 12 and the inner cylindrical surface 6 of the die 4 and thus preventing a breakdown of the pellet mill 2. During normal operation, the roller 12 will rotate around its center axis 46. It is contemplated that a safety mechanism of this kind is just as effective as the shear pin safety mechanisms of the pellet mills known in the art.

However, the present safety mechanism does not suffer from the same problems as those known in the art, because the rollers 12 are not free to rotate within the die 4, whereby it is precluded that they would interfere with the conduits 24, 26, 28 in the event of an overload of one of the rollers 12, 14, 16.

Figure 5:
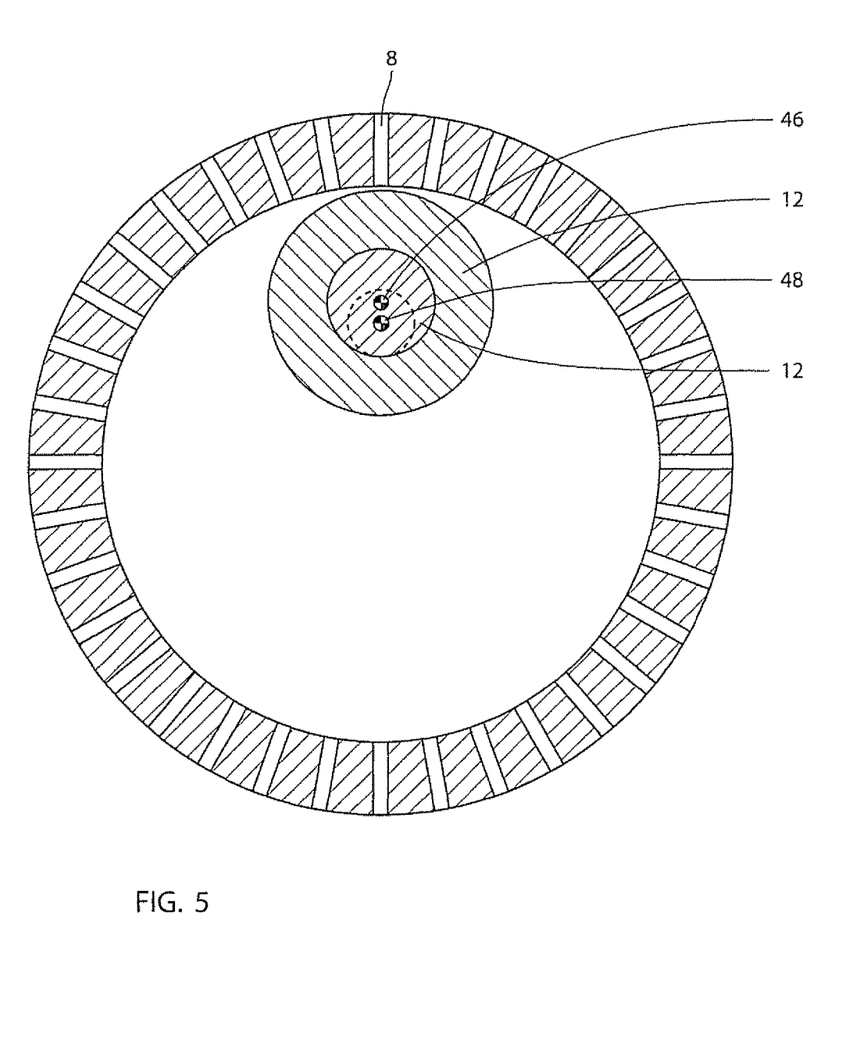
FIG. 5 illustrates a different cross section of the same configuration as shown in FIG. 4.

FIG. 5 merely illustrates a different cross section of the same configuration as shown in FIG. 4.

Figure 6:
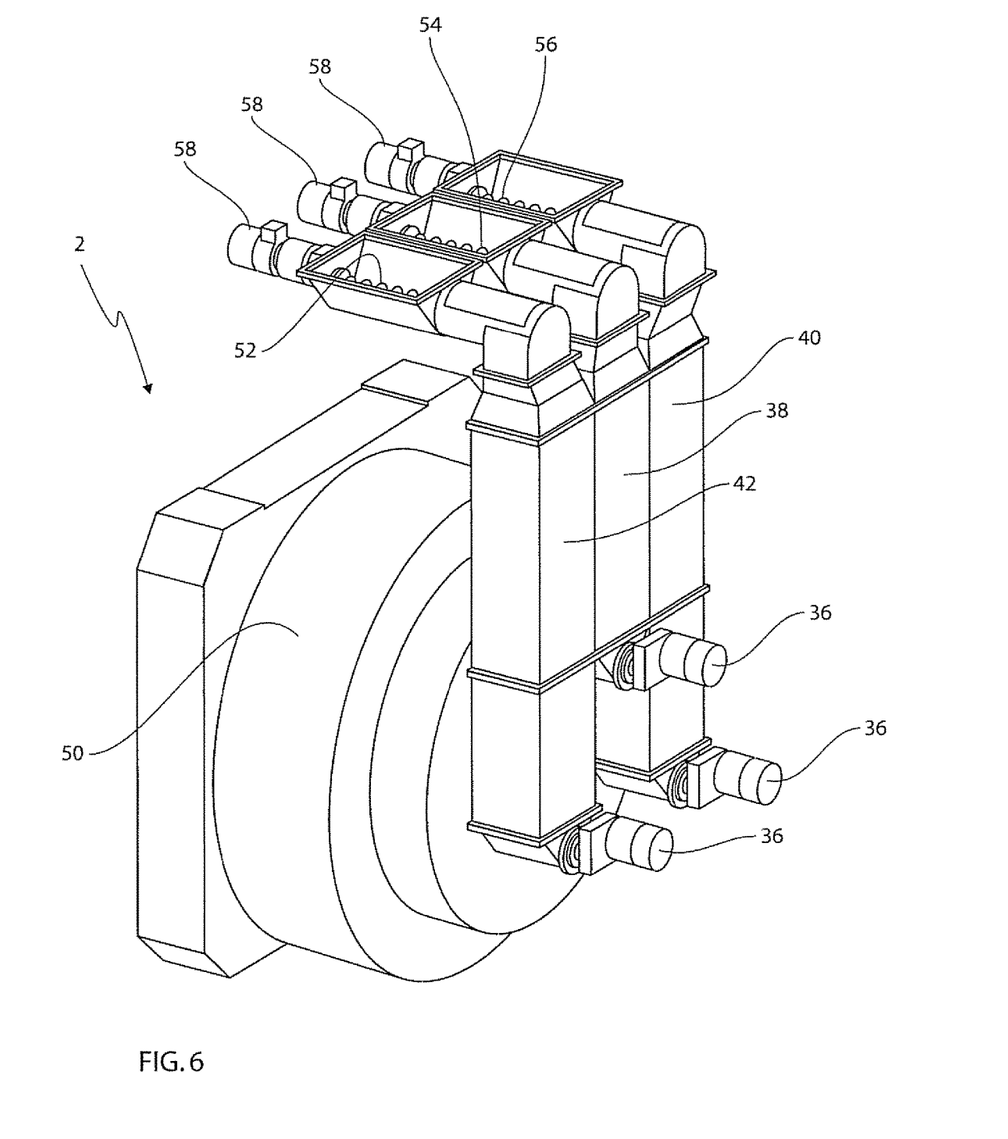
FIG. 6 shows a preferred embodiment of a pellet mill with an improved feed system.

FIG. 6 shows a preferred embodiment of a pellet mill 2 with an improved feed system. The die 4 (not shown) is placed inside a die housing 50. The screw conveyors in the conduits (not shown) are each driven by an electrical motor 36 at a fixed relatively high angular speed. Each of the conduits (and thereby each screw conveyor) is connected to individual hopper means 38, 40, 42, which in turn are fed by individual dosing conveyors 52, 54, 56 that feed each of said individual hopper means 38, 40, 42. The dosing conveyors 52, 54, 56 are each driven by an individual electrical motor 58.

In a further embodiment, each of these electrical motors 58 may be operatively connected to control means for individually adjusting the angular speed of the associated dosing conveyor 52, 54, 56 and thereby the feed of pelletizable material to each individual hopper means 38, 40, 42 associated with each individual conduit in dependence of at least one working condition of the pellet mill. This working condition is preferably the detection of an overload of the pellet mill 2 and may in particular be any of the working conditions mentioned above or in the section "summary of the invention". The dosing conveyors 52, 54, 56 are embodied as screw conveyors and they are preferably connected to a common material supply via individual hopper means.

Figure 7:
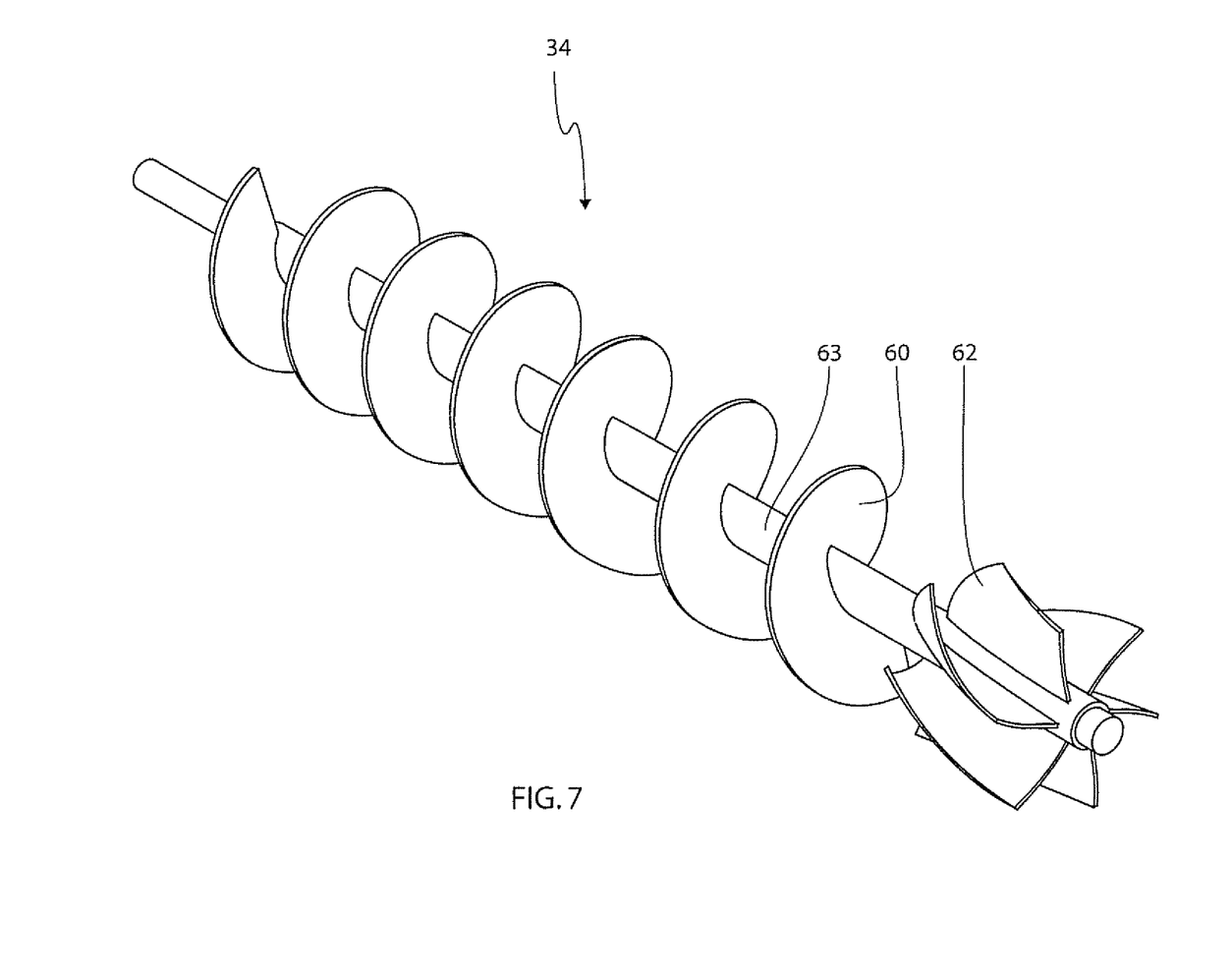
FIG. 7 shows an embodiment of a screw conveyor used in each of the conduits.

FIG. 7 shows an embodiment of a screw conveyor 34 used in each of the conduits 24, 26, 28. The screw conveyor 34 comprises two main sections. One first section comprising a helical screw 60 having a tapering in the direction of feed for feeding the pelletizable material 30 into the die chamber 10 through the conduits 24, 26, 28. The second section of the screw conveyor 34 comprises a plurality (in the illustrated example six) of expulsion blades 62 for expelling the pelletizable material through the side openings 32 of the conduits 24, 26, 28. The length of these expulsion blades along the shaft 63 of the screw conveyor is equal to or approximately equal to the length of the side openings 32 of the conduits 24, 26, 28. These expulsion blades 62 have a curved part with an increased curvature in the direction towards the helical screw 60. By this arrangement of the curvature of the expulsion blades 62, a more uniform distribution of the pelletizable material 30 over the entire length of the rollers 12, 14, 16 is achieved, whereby a more effective use of the full working capacity of the pellet mill 2 is achieved while the overall load on the rollers 12, 14, 16 is more evenly balanced.

LIST OF REFERENCE NUMBERS

In the following is given a list of reference numbers that are used in the detailed description of the invention.
2 pellet mill
4 die
6 inner cylindrical surface of the die
8 apertures in the die
10 die chamber
12, 14, 16 rollers
18, 20, 22 wedge-shaped spaces
24, 26, 28 conduits
30 pelletizable material
32 side opening in the conduit
34 screw conveyor
36 dive means for driving the screw conveyor
38, 40, 42 hoper means for feeding the conduits with pelletizable material
43 eccentric stud portion of roller shaft
44 roller shaft
46 center axis of roller
48 eccentric axis of roller
50 die housing
52, 54, 56 dosing conveyors
58 drive means of the dosing conveyors
60 helical screw
62 expulsion blade
63 shaft of the screw conveyor

The invention claimed is:
1. A pellet mill for forming pelleted material, comprising:
a die having a cylindrical inner surface with a plurality of apertures formed therein and extending to the outside of the die, the volume bounded by said inner cylindrical surface defining a die chamber,
at least two cylindrical rollers adapted to travel over said inner cylindrical surface of the die in a rolling motion,
drive means for causing relative rotation of the die and the rollers, so that the rollers will travel over the inner cylindrical surface of the die, thereby forming wedge-shaped spaces between the rollers and the inner cylindrical surface of the die,
a feed system, comprising at least two conduits, one associated with each of the at least two rollers, extending into the die chamber, said conduits having a circular cross section, and each comprising a screw conveyor having a shaft tapering in the direction of feed, each of the conduits further having a side opening for feeding the pelletizable material into the wedge- shaped spaces between the rollers and the inner cylindrical surface of the die, the side opening extending axially along the conduit and having an extension that is equal to the length of the rollers, characterized in that at least one of the conduits is configured for expelling the pelletizable material through its side opening in an upward direction directly to a wedge-shaped space, which is at a higher location in the die chamber than said conduit, and in that the screw conveyor comprises a first section comprising a helical screw and a second section comprising a plurality of curved expulsion blades having an increased curvature in the direction towards the helical screw and a length corresponding to the length of the side opening in the conduits.

2. A pellet mill according to claim 1, comprising at least three rollers and at least three associated conduits.

3. A pellet mill according to claim 1, further comprising means for angular adjustment of each of the conduits about its longitudinal axis, thereby adjusting the direction, in which the pelletizable material is expelled through the side opening.

4. A pellet mill according to claim 1, further comprising drive means for driving the screw conveyors independently of each other.

5. A pellet mill according to claim 1, further comprising drive means for dynamically adjusting the speed of each of the screw conveyors independently of each other, and in dependence of the measurement of at least one working condition of the pellet mill.

6. A pellet mill according to claim 1, further comprising individual hopper means connected to each of the conduits, wherein each of the individual hopper means are connected to a dosing conveyor for feeding pelletizable material to each individual conduit.

7. A pellet mill according to claim 6, wherein each of these dosing conveyors are operatively connected to control means for individually adjusting the fed of pelletizable material to each individual hopper means associated with each individual conduit in dependence of at least one working condition of the pellet mill.

8. A pellet mill according to claim 1, wherein each of the rollers are mounted on a roller shaft having an eccentric stud.

9. A pellet mill according to claim 8, wherein each of the roller shafts are operatively connected to positioning means for individually adjusting the distance between each roller and the cylindrical inner surface of the die dependent on the measurement of at least one working condition of the pellet mill.

10. A pellet mill according to claim 1, wherein each of the rollers are mounted on a roller shaft, and wherein each of the roller shafts is operatively connected to positioning means for individually adjusting the distance between each roller and the cylindrical inner surface of the die dependent on the measurement of at least one working condition of the pellet mill.

11. A pellet mill according to claim 7, wherein the at least one working condition of the pellet mill is the angular speed of rotation of a roller and/or the physical distance between a roller and the inner cylindrical surface of the die.

12. A pellet mill according to claim 9, wherein the positioning means comprises hydraulic cylinder and piston means and wherein the distance between a roller and the inner cylindrical surface of the die is adjusted dependent on a measurement of the oil pressure of the hydraulic system associated with the hydraulic cylinder and piston means.

13. A method of forming pellets in a pellet mill having at least two cylindrical rollers and a cylindrical die chamber defined by a volume bounded by an inner cylindrical surface of a die, the inner cylindrical surface having a plurality of apertures formed therein that extend to an outside of the die, the method comprising:

feeding pelletizable material into the cylindrical die chamber via at least two conduits that are correspondingly associated with each of the least two rollers within the die chamber, extend into the die chamber, and each have a circular cross section and a screw conveyor that is placed in the screw conveyer and has a shaft tapering in the direction of feed;

relatively rotating the die and the at least two rollers to cause the at least two rollers to travel over the inner cylindrical surface of the die in a rolling motion, thereby forming wedge-shaped spaces between the rollers and the inner cylindrical surface of the die, whereby the peletizable material is forced through the plurality of apertures formed in the inner cylindrical surface of the die;

expelling the pelletizable material directly into the wedge-shaped spaces between the rollers and the inner cylindrical surface of the die through a side opening in each of the at least two conduits that extends axially along the conduit and has an extension that is equal to a length of the rollers, and wherein at least one of the conduits expels the pelletizable material in an upward direction directly to a wedge-shaped space, which is at a higher location in the die chamber than said conduit, and wherein the screw conveyor comprises a first section comprising a helical screw and a second section comprising a plurality of curved expulsion blades having an increased curvature in the direction towards the helical screw and a length corresponding to the length of the side opening in the conduits thereby providing a uniform expulsion of said pelletizable material along the length of said side opening in the conduits.

14. The method according to claim 13, wherein the at least two rollers and at least two associated conduits are exactly three rollers and exactly three associated conduits.

15. The method according to claim 13, further comprising the step of adjusting the direction in which the pelletizable material is expelled through the side opening by angularly adjusting each of the conduits about its longitudinal axis.

16. The method according to claim 13, further comprising the step of feeding the pelletizable material to each of the conduits via individual hopper means connected to each of the conduits.

17. The method according to claim 16, further comprising the step of individually adjusting the feed of pelletizable material to each individual hopper means in dependence of at least one working condition of the pellet mill by dosing conveyors feeding the pelletizable material to each individual hopper means.

18. The method according to claim 13, further comprising the step of providing each of the rollers with a roller shaft having an eccentric stud.

19. The method according to claim 18, further comprising the step of providing each of the roller shafts with a shear point safety pin configured to break in response to an overload condition of the pellet mill.

20. The method according to claim 13, further comprising the step of adjusting the distance between a roller and the inner cylindrical surface of the die by hydraulic cylinder and piston means.

21. The method according to claim 20, wherein the step of adjusting the distance between a roller and the inner cylindrical surface of the die is performed in dependence of a measurement of the oil pressure of the hydraulic system associated with the hydraulic cylinder and piston means.

* * * * *